(No Model.)

S. H. LEMON.
SPIRIT LEVEL.

No. 281,086. Patented July 10, 1883.

WITNESSES:
Donn Twitchell.
C. Sedgwick.

INVENTOR:
S. H. Lemon
BY Munn & Co.
ATTORNEYS.

UNITED STATES PATENT OFFICE.

SAMUEL H. LEMON, OF NEW YORK, N. Y.

SPIRIT-LEVEL.

SPECIFICATION forming part of Letters Patent No. 281,086, dated July 10, 1883.

Application filed December 23, 1882. (No model.)

*To all whom it may concern:*

Be it known that I, SAMUEL H. LEMON, of the city, county, and State of New York, have invented certain new and useful Improvements in Levels, of which the following is a full, clear, and exact description.

The object of the invention is to improve a spirit-level instrument, as hereinafter described, and pointed out in the claims.

The invention comprises an index and spirit-level carrier capable of circular adjustment within a suitable holder and concentrically to a graduated dial connected with said holder; also, means for locking or setting the rotating index and spirit-level carrier in any desired position relatively to the dial, substantially as hereinafter described.

Reference is to be had to the accompanying drawings, forming part of this specification, in which similar letters of reference indicate corresponding parts in all the figures.

Figure 1:
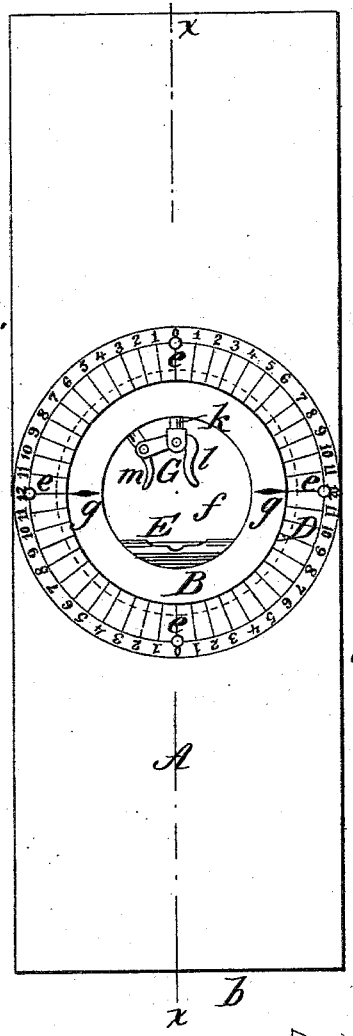
Figure 2:
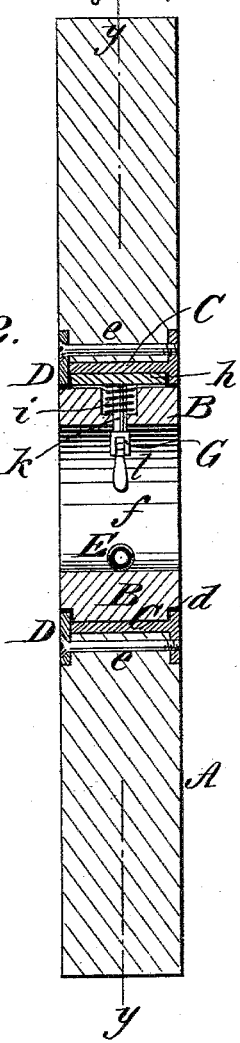
Figure 3:
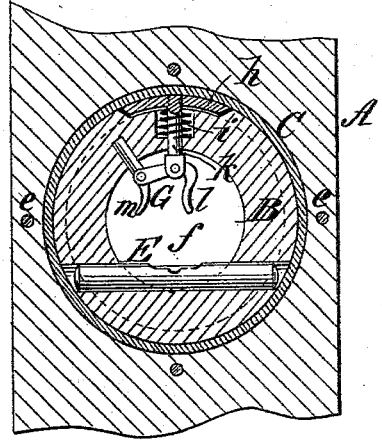

Figure 1 represents a face view of a leveling-instrument embodying my invention; Fig. 2, a section of the same, taken as indicated by the line $x\ x$ in Fig. 1; and Fig. 3, a further section thereof on the line $y\ y$ in Fig. 2.

A in the drawings indicates a base or body piece, which may be of wood of any given thickness and of rectangular form, or at least with one of its sides $a$ and ends $b$ at right angles to each other. This base-piece has a recess or hole formed facially in or through it, and serves to receive within it the circularly-adjustable index and spirit-level carrier B, or an internally circular bushing or box, C, within which said combined index and carrier is free to rotate. Said box, where used, virtually forms the holder for the index and carrier B, that is here represented as of annular construction, and as retained within the box by an entering flange, $d$, at its lower end and a covering annular fixed graduated dial, D, at its upper end, united by screws $e\ e$ with the flange $d$. Arranged to cross this combined index and carrier B in the direction of a chord, and firmly secured within it, so as to be visible through the central opening, $f$, in said index and carrier, is a spirit-level or leveling-tube, E, which is parallel with oppositely-arranged pointers or marks $g\ g$ on the index and carrier, transversely of its axis.

The annular dial D in the face of the instrument is graduated through each successive fourth or quarter of its surface into fractions of an inch or other standard of measurement. The divisions thus formed are here shown as running from zero (0) to twelve, (12;) but such divisions, of course, are arbitrary.

Supposing the instrument to be accurately adjusted, so that when applied to a level or plumb surface the air-bubble will be visible and in the center of the glass tube of the spirit-level E and the pointer or pointers $g$ in line with twelve (12) on the dial or with zero, (0), according to the set or adjustment of the combined index and spirit-level carrier B within the box C, then, when using the instrument on a surface to be tested, by applying its side or end thereto, should said surface be out of plumb or level, the air-bubble will not be in the center or portion of the tube, where it would be if the surface were plumb or level, and to bring it in such position it will be necessary to turn the combined index and carrier B in one or other opposite directions, and the extent of this movement will be indicated by the pointer or pointers $g$ on the dial D, and show, in actual measurements thereon, the extent, in fractions of an inch or other measurement, that said surface is out of plumb or level.

To hold the combined index and spirit-level carrier B as set or in the position to which it may have been adjusted, and to provide for the turning of the same as required, said device B is recessed on its periphery, to receive within it a friction clamping-plate, $h$, of a spring or automatic friction-clamp, G, said plate $h$ being pressed against the interior of the box C by a spring, $i$, and being connected by a rod, $k$, with a crooked movable handle, $l$, arranged within the opening $f$ and pivoted to a fixed handle, $m$, fast to the device B, so that when pressing on the handles $l$ and $m$ the clamp is released from its hold within or against the interior of the box C, and on releasing hold of said handles said clamp automatically adapts itself to hold the combined index and spirit-level carrier B in its set or adjusted position. The handles of the clamp may also be used to turn or rotate the device B, making the same application of the fingers serve both to release said device and to turn it.

Duplicate instruments of this description may be applied, one to either leg or arm of an adjustable bevel, for indicating angular surfaces; or the instrument may be combined with a square, rule, or compass, or be used as a mere level, grade, and plumb.

Having thus described my invention, what I claim as new, and desire to secure by Letters Patent, is—

1. The combination, with the body-piece A, of the level-carrier B, the bushing C, having flange d, and the dial D, secured to said flange by screws e e, substantially as shown and described.

2. The combination, with the dial D, of two pointers, g g, arranged diametrically opposite to each other on carrier B, and above but parallel with the spirit-level, whereby the exact variation from a level may be obtained, as described.

3. In a spirit-level, the combination, with a carrier, B, having a recess in its periphery, and the bushing C, of the spring clamp-plate h, the spring i, the rod k, and the handles l m, as and for the purpose specified.

4. The combination of the spring-clamp G, provided with finger-pieces or handles l m, the annular index B, within which said handles are arranged, the cross spirit-level E, the box C, the dial D, and the base-piece A, holding said box within it, essentially as shown and described.

SAMUEL H. LEMON.

Witnesses:
HENRY BEENY,
ALBERT DE LA MONTAGNIE.